UNITED STATES PATENT OFFICE.

WILLIAM HOOKER AND LUCY HOOKER, OF NORTH FITZROY, VICTORIA.

SOLUTION FOR ILLUMINANT MANTLES FOR BUNSEN GAS-BURNERS.

SPECIFICATION forming part of Letters Patent No. 573,513, dated December 22, 1896.

Application filed August 19, 1895. Serial No. 559,777. (No specimens.)

*To all whom it may concern:*

Be it known that we, WILLIAM HOOKER and LUCY HOOKER, subjects of the Queen of Great Britain and Ireland, residing at 40 Freeman Street, North Fitzroy, in the Colony of Victoria, have invented a certain new and useful Improved Solution for Illuminant Mantles for Bunsen Gas-Burners, of which the following is a specification.

Our present invention consists of an improved solution that is to be used for the purpose of saturating the mantles hereinafter described, so that after said mantles are what is known as "burned off" and kept suspended in contact with the flame of a Bunsen gas-burner they will become incandescent to such an extent as to give a good illumination and an excellent tone of light.

By the use of our solution the mantles are more durable and also less expensive to the user than other illuminant mantles hitherto used in connection with Bunsen gas-burners.

We are aware that mantles for Bunsen gas-burners have hitherto been used, but such mantles have consisted of a vegetable textile material.

Our solution is employed for mantles made of silk thread knitted to the form or shape of the finger of a glove, but larger, and we subject said mantles to the treatment hereinafter described. The silk not only readily absorbs said solution, but also after the mantle is burned off, as previously mentioned, it is composed, essentially, of the residuum of the solution held intact by a pliable frame or body.

The following is the solution which we employ for the saturation of our mantles. This quantity will only serve to saturate about twenty mantles, but for a greater number the proportions would be increased accordingly: one ounce (apothecary) sulfate of magnesium, one dram (apothecary) acetate of magnesium, (saturated solution,) two drams (apothecary) chrome-alum, (saturated solution.)

A saturated solution of chromas-potassi (yellow crystal) may or may not be added to our solution. When we employ same, five drops only would be introduced into the foregoing solution.

Before saturating our mantles in the foregoing solution we treat them as follows: The mantles are first boiled in soapy water, in which they are allowed to remain for fifteen minutes or thereabout. They are then removed and washed in hot water in order to remove the soapy matter. The mantles are next squeezed dry for the purpose of removing the superfluous liquid. The mantles are then saturated in our solution for, say, seven days, and after removal are dried for use.

In order to produce the illumination, the saturated mantle is conveniently suspended over a Bunsen burner for the purpose of rendering it incandescent, in which case it immediately becomes an incombustible pliable frame or body.

Having now described our invention, what we claim as new, and desire to secure by Letters Patent, is—

1. The hereinbefore-described solution, consisting of sulfate of magnesium, acetate of magnesium, and chrome-alum, all incorporated in the proportions hereinbefore described.

2. The hereinbefore-described solution consisting of sulfate of magnesium, acetate of magnesium and chrome-alum and chromas-potassi, all incorporated in the proportions hereinbefore described.

In witness whereof we have hereunto set our hands in presence of two witnesses.

WILLIAM HOOKER.
LUCY HOOKER.

Witnesses:
ALBERT E. B. SWANSON,
HENRY MOORE.